United States Patent
Younis

(10) Patent No.: US 7,302,225 B2
(45) Date of Patent: *Nov. 27, 2007

(54) TIME ACQUISITION IN A WIRELESS POSITION DETERMINATION SYSTEM

(76) Inventor: Saed Younis, 8 Abou El-Karamat St., Mohandessen, Giza (EG)

( * ) Notice: Subject to any disclaimer, the term of this patent is extended or adjusted under 35 U.S.C. 154(b) by 190 days.

This patent is subject to a terminal disclaimer.

(21) Appl. No.: 10/840,900

(22) Filed: May 7, 2004

(65) Prior Publication Data

US 2005/0003833 A1 Jan. 6, 2005

Related U.S. Application Data

(63) Continuation of application No. 10/099,096, filed on Mar. 15, 2002, now Pat. No. 6,907,224.

(60) Provisional application No. 60/276,722, filed on Mar. 15, 2001.

(51) Int. Cl.
*H04B 7/185* (2006.01)

(52) U.S. Cl. ............ 455/12.1; 455/502; 455/13.2; 342/357.01; 342/357.09

(58) Field of Classification Search ............ 455/456.1, 455/456.6, 556.1, 557, 12.1, 13.2, 502; 342/357.01, 342/358; 701/213, 214
See application file for complete search history.

(56) References Cited

U.S. PATENT DOCUMENTS

| | | | |
|---|---|---|---|
| 5,663,735 A | 9/1997 | Eshenbach | |
| 5,945,944 A | 8/1999 | Krasner | |
| 6,031,489 A * | 2/2000 | Wyrwas et al. | 342/357.16 |
| 6,035,202 A * | 3/2000 | Camp, Jr. | 455/456.1 |
| 6,058,338 A | 5/2000 | Agashe et al. | |
| 6,081,229 A * | 6/2000 | Soliman et al. | 342/357.05 |
| 6,111,540 A | 8/2000 | Krasner | |
| 6,133,874 A | 10/2000 | Krasner | |
| 6,185,429 B1 | 2/2001 | Gehrke et al. | |
| 6,188,351 B1 | 2/2001 | Bloebaum | |

(Continued)

*Primary Examiner*—Temica Beamer
(74) *Attorney, Agent, or Firm*—Thomas Rouse; Bruce Greenhaus; Andrea Mays

(57) ABSTRACT

A system and method for providing timing information to a wireless device in a position determination system is disclosed. A wireless device includes a reference signal receiver, a signal processor, a wireless communications transceiver and a GPS receiver. The wireless device is adapted to receive a reference signal, extract a snippet of the received reference signal, determine a time of reception for the snippet and transmit the snippet and time of reception to a position determination entity as part of a request for GPS aiding information. The position determination entity includes a timing source, a GPS memory for storing GPS satellite information, a reference signal memory, a communications interface, a signal processor and a control processor. The position determination entity is adapted to continually receive and store a reference signal along with an associated time of reception, and receive the snippet and timestamp transmitted from the wireless device. The position determination entity is further adapted to match the signal snippet to a portion of the stored reference signal, determine a time offset between the timestamp and the time of reception of the matched portion of the stored reference signal, prepare aiding information for the wireless device, synchronize the aiding information to the wireless device using the time offset, and transmit the synchronized aiding information to the wireless device. The wireless device is further adapted to receive the aiding information, including timing information to assist the wireless device in acquiring the GPS signals.

15 Claims, 7 Drawing Sheets

U.S. PATENT DOCUMENTS

| | | |
|---|---|---|
| 6,346,911 B1 | 2/2002 | King |
| 6,642,884 B2 | 11/2003 | Bryant et al. |
| 6,725,158 B1 | 4/2004 | Sullivan et al. |
| 6,907,224 B2 * | 6/2005 | Younis ..................... 455/12.1 |

* cited by examiner

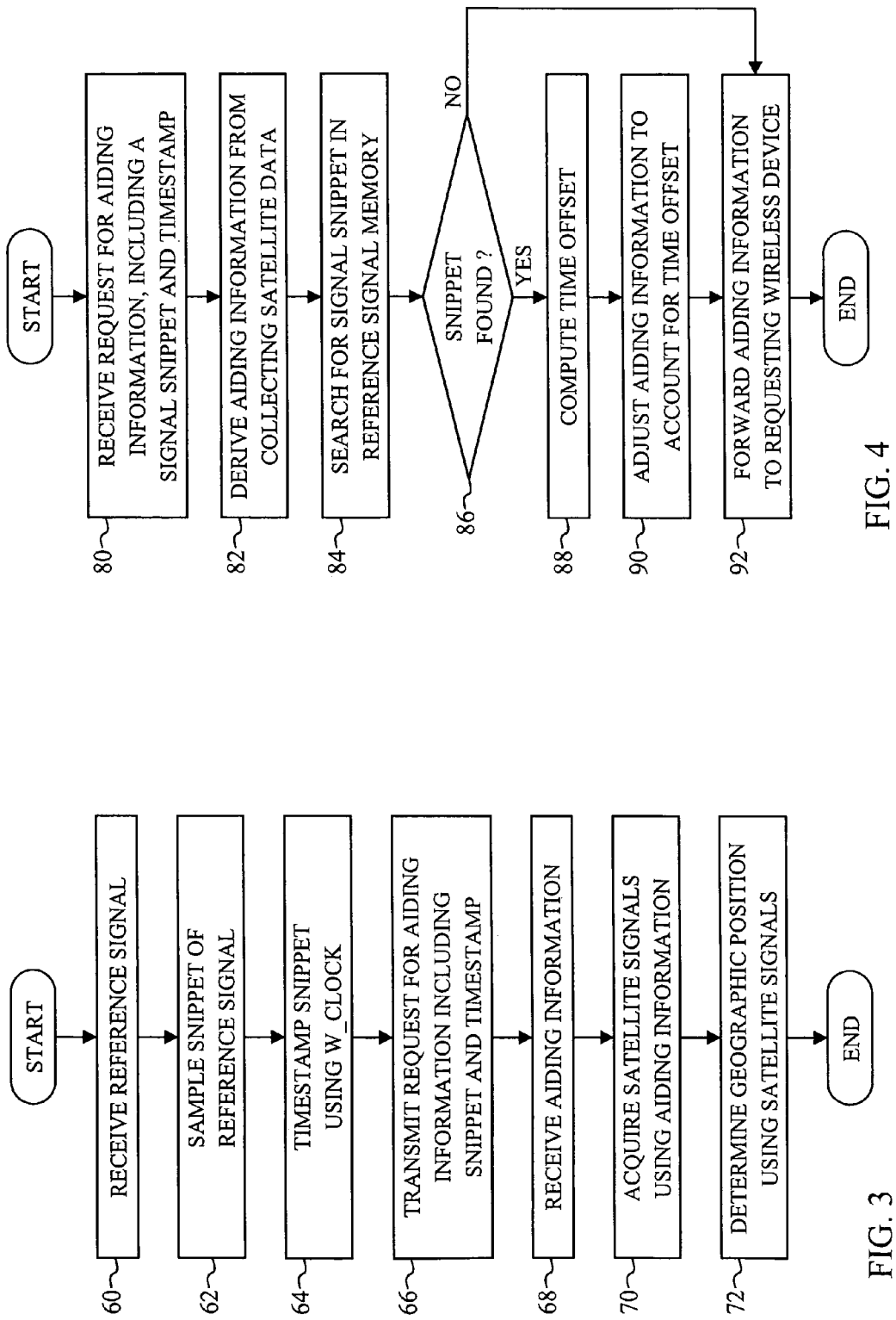

TIME ACQUISITION IN A WIRELESS POSITION DETERMINATION SYSTEM

RELATED APPLICATIONS

This application is a continuation of U.S. patent application Ser. No. 10/099,096, filed on Mar. 15, 2002, now U.S. Pat. No. 6,907,224, which claims priority to U.S. Provisional Application No. 60/276,722, filed on Mar. 15, 2001.

BACKGROUND OF THE INVENTION

1. Field of the Invention

The present invention relates generally to position determination systems and, in particular, to providing timing information to a wireless device in a position determination system.

2. Description of the Related Art

Systems for determining the geographic position of a wireless device are well known in the art. A commonly used position determination system is the Global Positioning System (GPS) operated by the United States Department of Defense. The GPS includes a network of 24 satellites that orbit the earth in six circular planes. The GPS satellites are spaced so that, at any given time and from any geographic position, at least five GPS satellites will be above the horizon. Each GPS satellite continually transmits its current time and current position for reception by GPS receivers on earth. A GPS receiver may determine its geographic position by locating the signals transmitted from four of the GPS satellites that are in view. The difference between each signal's transmission time and reception time is used to calculate the distances (i.e., pseudoranges) between the GPS receiver and each of the four GPS satellites. These distance measurements, along with the satellite position and time information received through the GPS signals, are used by the GPS receiver to synchronize its internal clock with the GPS clock and calculate its longitude, latitude and altitude with an accuracy of less than 100 meters.

The GPS satellites transmit the GPS signals on the 1575.42 MHz carrier frequency using direct spread spectrum modulation. Each GPS signal is modulated by a pseudorandom noise (PN) code that uniquely identifies the transmitting GPS satellite. Each PN code is a repeating sequence of 1023 chips that is transmitted at a rate of 1023 chips per millisecond. To locate a particular GPS signal, the GPS receiver generates a replica of the associated 1023 chip PN code sequence and searches for a matching 1023 chip sequence in a received signal. The GPS signal will be found if the GPS receiver is able to align the replica, chip-to-chip, with a 1023 chip sequence in the received signal. Many GPS receivers include correlator hardware that allows a range of contiguous chip positions (e.g., 32 chips) to be searched in parallel, thereby reducing the time needed to search across each of the 1023 chip positions. In addition, due to Doppler shift, the perceived carrier frequency of each received GPS signal will vary depending on the relative positions of the GPS receiver and the transmitting GPS satellite. Because the relative positions of the GPS satellites and GPS receiver are typically unknown, the search for a GPS signal may further require searching across a range of potential carrier frequencies.

An exhaustive search across the entire range of potential carrier frequencies for each of the 24 PN codes can be undesirably time consuming—in many cases taking minutes. To reduce the search time, GPS receivers are often provided with aiding information that may be used to help identify the GPS satellites that are in view and the associated Doppler frequencies of each associated GPS signal before commencing the search. In one approach, the GPS receiver stores almanac data describing the approximate orbits of the GPS satellites. Using the almanac data, its internal clock and an estimate of its current position, the GPS receiver calculates the approximate positions of the GPS satellites and identifies which of the 24 GPS satellites are likely to be in view. Next, the GPS receiver estimates the Doppler shift of each GPS signal transmitted from the identified GPS satellites. A search for a GPS signal may then be conducted, focusing on the PN codes of the identified GPS satellites and centered about the expected Doppler frequencies. Although the use of almanac data can reduce the search time, the use of almanac data lacks the precision and efficiency of other known approaches.

In one known approach, the GPS signal acquisition time is reduced through the use of a position determination entity (PDE). A PDE is typically part of a wireless communications network that includes a plurality of base stations and at least one mobile device. The PDE continually tracks the positions of the GPS satellites through a network of stationary GPS receivers distributed across the coverage area of the wireless communications network. Before searching for the GPS signals, the mobile device transmits a request for GPS aiding information to the PDE through a local base station. Using the identity of the local base station, the PDE determines the approximate location of the mobile device and provides the mobile device with the identities and positions of the GPS satellites that are likely to be in view, and the expected Doppler shift of each identified GPS signal. The real-time information compiled by the PDE is typically more precise than standard almanac data and often results in a shorter GPS signal acquisition time.

The GPS signal acquisition time has been reduced even further in code division multiple access (CDMA) networks. In a CDMA network, each base station maintains a clock that is synchronized with the GPS time and transmits a timing beacon to mobile devices in its coverage area. The mobile devices use the timing beacons to synchronize their internal clocks with the base station's clock, often with an accuracy of less than 4 microseconds. The PDE and stationary GPS receivers also maintain clocks that are synchronized with the GPS time. In operation, the stationary GPS receivers track the times at which the beginning of each PN frame (i.e., 1023 chip PN code sequence) is received by the stationary GPS receiver. The PDE transmits the identities of the GPS satellites in view to the mobile device, along with the associated Doppler shift and associated PN frame reception time of each GPS signal. The mobile device may use this information to identify the GPS satellites in view, the expected reception frequencies of the associated GPS signals, and the times at which the associated PN frames are expected to be received at the stationary GPS receiver. Using the received GPS timing information, the mobile device is able to quickly align the generated 1023 chip PN code sequence with a matching 1023 chip sequence from the received GPS signal.

In many wireless communications networks, however, such as asynchronous wideband code division multiple access (WCDMA) networks and Global System for Mobile Communications (GSM) networks, the internal clocks of the mobile devices are not necessarily synchronized with the base stations, PDEs and stationary GPS receivers. Consequently, a mobile device cannot rely on information that describes the time at which a stationary GPS receiver expects to receive the beginning of each PN frame. Transmitting such GPS timing information to the mobile device would provide little benefit in terms of reducing the GPS signal acquisition time.

In view of the above, there is a need for an improved system and method for providing timing information to a wireless device in a position determination system to assist the wireless device in acquiring GPS signals.

SUMMARY OF THE INVENTION

The present invention is an improved system and method for providing timing information to a mobile device in a position determination system. In a preferred embodiment, a wireless communications network, such as an asynchronous WCDMA network, includes a base station, a mobile device and a position determination entity (PDE). The PDE communicates with the wireless device through the base station and assists the wireless device in locating satellite positioning system (SPS) satellites that are in view. The PDE and the wireless device each include at least one reference signal receiver for receiving a reference signal. The reference signal may include any signal that is capable of reception by both the PDE and the wireless device. For example, the reference signal may be an FM radio broadcast signal, an AM radio broadcast signal, a television broadcast signal or another radio frequency signal. Preferably, the reference signal includes one or more signals that collectively provide substantially ubiquitous coverage throughout the wireless communications system.

In operation, the PDE continually receives the reference signal and stores a sample of the received reference signal in a signal buffer. In addition, at least one stationary SPS receiver continually receives the SPS signals transmitted from the SPS satellites and tracks the identities and positions of the SPS satellites that are in view. The stationary SPS receiver derives current Doppler shift information for the SPS signals and tracks the periodic time at which each PN frame is expected to be received. The information collected by the SPS receiver is transmitted to the PDE and stored in an SPS memory.

To determine the geographic position of the wireless device, the wireless device receives the reference signal and samples a snippet of the received signal. The time at which the snippet was received by the wireless device is determined using the wireless device's local clock, $W_{13}$ CLOCK. The wireless device transmits the snippet and the timestamp to the PDE as part of a request for SPS aiding information. In response, the wireless device receives the requested SPS aiding information and uses the aiding information to help it acquire the SPS signals. In a preferred embodiment, the aiding information includes the time, as measured by $W_{13}$ CLOCK, at which the wireless device is expected to receive the beginning of each PN frame that is associated with an SPS satellite that is in view. After the SPS signals are acquired, the position of the wireless device may be calculated.

The PDE preferably provides aiding information to a wireless device in response to a request for SPS assistance, which includes a reference signal snippet and a timestamp. Using the SPS satellite information stored in the SPS memory, the PDE prepares SPS aiding information that includes the identities of the SPS satellites in view to the wireless device, associated Doppler information, and the time at which the beginning of each PN frame is expected to be received at the wireless device. Next, the PDE searches for the received reference signal snippet in the signal buffer. If a match is found the PDE computes a time offset between the received timestamp and the reception time of the stored signal. The time offset is used to convert the SPS timing data in the aiding information to the time domain used by the wireless device. The modified aiding information is then transmitted to the wireless device for use in acquiring the SPS signals. In an alternate embodiment, the aiding information (unmodified) and the time offset may be transmitted to the wireless device, which may then use the time offset to synchronize W_CLOCK or perform other adjustments to the SPS timing data.

In a preferred embodiment, the wireless device includes a timing source, a reference signal receiver adapted to receive a radio frequency (RF) signal, and a signal processor coupled to the reference signal receiver. The signal processor is adapted to sample a snippet of the received RF signal and determine a time of reception at which the snippet was received by the reference signal receiver. The wireless device further includes a wireless communications transceiver and a satellite positioning system (SPS) receiver. The wireless communications transceiver is adapted to transmit the snippet and time of reception to a position determination entity and, in response, receive SPS aiding information from the position determination entity. The SPS receiver is adapted to receive SPS signals transmitted from SPS satellites that are in view. In a preferred embodiment, the reference signal receiver, the communications receiver and SPS receiver share at least a portion of the receiver circuitry.

The position determination entity of the preferred embodiment includes a timing source, a reference signal buffer, an SPS memory storing SPS positioning information, a communications interface and a processor. The reference signal buffer stores recent samples of the received reference signals, along with associated time of reception information. The communications interface is adapted to receive a request for aiding information from a wireless device, which includes a signal snippet and a timestamp, and transmit aiding information back to the wireless device. The processor is adapted to search for the received signal snippet in the stored reference signal, determine a time offset between the received timestamp and a matching portion of the stored reference signal, prepare aiding information from the SPS satellite information to assist the wireless device in locating the SPS signals, and adjust the aiding information using the time offset to synchronize the aiding information with the wireless device.

A more complete understanding of Time Acquisition in a Wireless Position Determination System will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

FIG. 3 is a flow diagram illustrating a preferred process for determining the geographic position of a wireless device;

FIG. 4 is a flow diagram illustrating a preferred process for providing the aiding information to the wireless device;

DETAILED DESCRIPTION OF THE PREFERRED EMBODIMENTS

Figure 1:
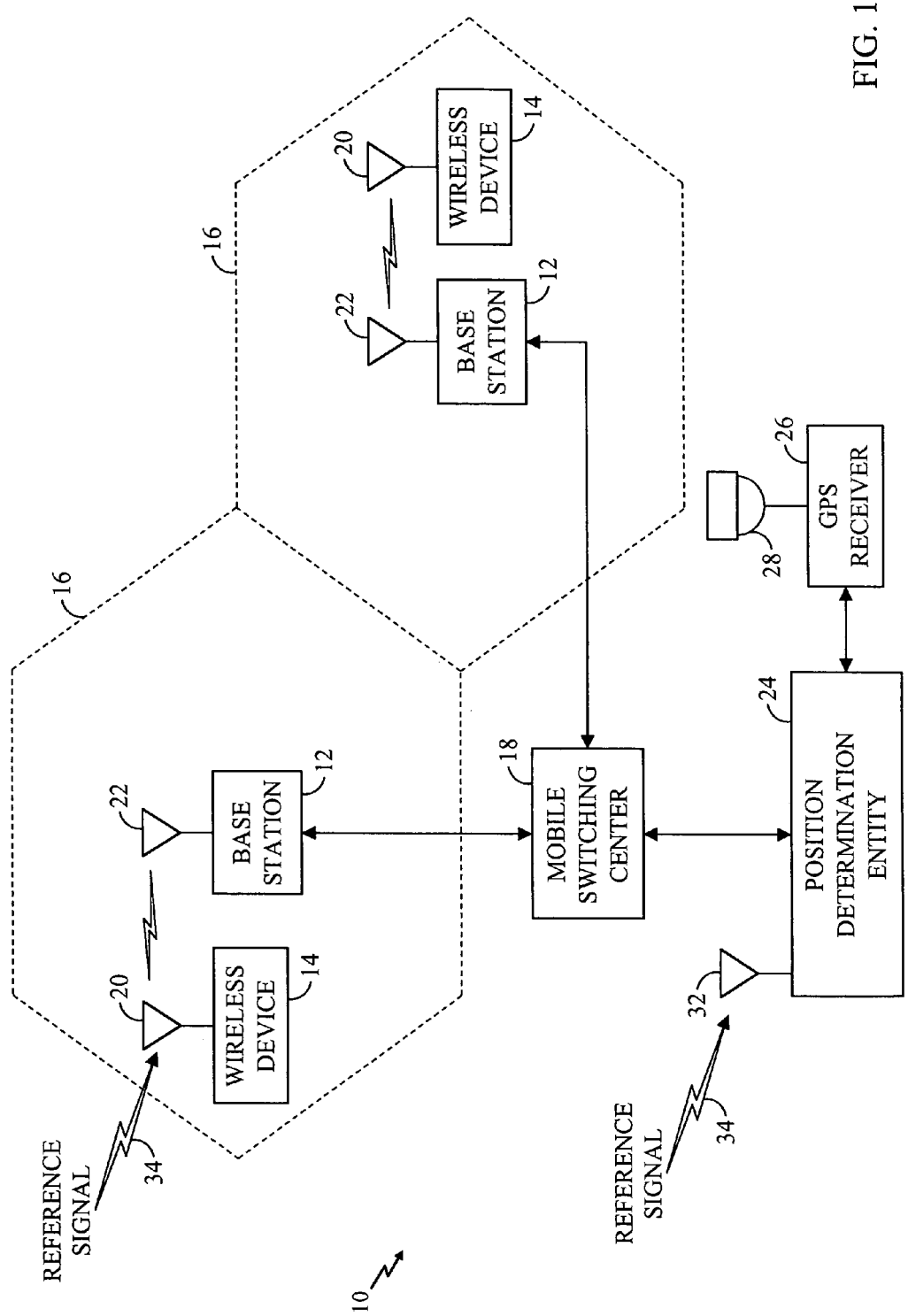
FIG. 1 illustrates a wireless communications system in accordance with a preferred embodiment of the present invention.

The present invention is an improved system and method for providing timing information to a mobile device in a position determination system. FIG. 1 illustrates a wireless communications system 10 in accordance with a preferred embodiment of the present invention. The wireless communications system 10 is a cell-based communications system including a plurality of base stations 12 and a plurality of wireless devices 14. Each base station 12 has an associated cell 16 defining a geographical coverage area serviced by the base station 12. Each wireless device 14 positioned within one of the cells 16 is adapted to communicate with the associated base station 12 by exchanging data packets according to a predetermined communications protocol, such as wideband code division multiple access (WCDMA). The wireless devices 14 may be any devices that are adapted to communicate with the base stations 12 over a wireless communications link, including mobile telephones, personal digital assistants (PDAs), vehicle navigation systems and portable computers. A mobile switching center (MSC) 18 manages the wireless communications in the cells 16, including call set-up, routing calls between wireless devices and routing calls between wireless devices and a communications network, such as a public switched telephone network (PTSN) or the Internet. It will be appreciated that the wireless communications system 10 may include a plurality of MSCs, each managing a plurality of cells 16. In alternate embodiments, the wireless communications system may be any other communications system in which a wireless device is capable of communicating with a second device or entity across a wireless communications link, including terrestrial or satellite based cellular communications systems, a personal communication system, a specialized mobile radio system, an Advanced Mobile Phone System (AMPS), a Global System for Mobile Communications (GSM), a pager system and a wireless packet data system.

The wireless communications system 10 is further adapted to determine the geographic position of the wireless devices 14. In a preferred embodiment, a satellite positioning system, such as the Global Positioning System (GPS), is used for position determination. Each wireless device 14 includes at least one antenna 20 for communicating with a local base station 12 and receiving GPS signals transmitted from orbiting GPS satellites. Each base station 12 includes at least one antenna 22 for communicating with the wireless devices 14. A position determination entity (PDE) 24 is connected to the base station 12 through the MSC 18 and assists the wireless devices 14 in locating the GPS satellites that are in view and calculating the respective geographic positions of the wireless devices 14. In a preferred embodiment, the PDE 24 is a computer system that tracks the location of the GPS satellites using at least one stationary GPS receiver 26, which receives GPS signals through a GPS antenna 28. The wireless communications system 10 preferably includes a network of GPS receivers 26 positioned throughout its coverage area. In one embodiment, each base station 12 includes a PDE 24 and stationary GPS receiver 26 for providing assistance to wireless devices 14 in the base station's coverage area 16.

Wireless assisted GPS systems are well-known in the art and include systems that assist the wireless device 14 in efficiently locating the GPS satellites that are in view, systems that reduce the error in the calculated geographic positions, and systems that assist in determining the position of the wireless device using less than 4 GPS satellites. Examples of GPS position determination systems in wireless communications networks are disclosed in U.S. Pat. No. 6,058,338, entitled "METHOD AND APPARATUS FOR EFFICIENT GPS ASSISTANCE IN A COMMUNICATION SYSTEM" and U.S. Pat. No. 6,081,229, entitled "SYSTEM AND METHOD FOR DETERMINING THE POSITION OF A WIRELESS CDMA TRANSCEIVER," both assigned to assignee, and U.S. Pat. No. 6,133,874, entitled "METHOD AND APPARATUS FOR ACQUIRING SATELLITE POSITIONING SYSTEM SIGNALS," assigned to SnapTrack, Inc., all of which are incorporated herein by reference. In a preferred embodiment, the position of the wireless device 14 is determined in accordance with gpsOne™ position location technology, developed by assignee. Using gpsOne™ technology, the wireless device 14 simultaneously collects measurements from at least one GPS satellite and at least one base station and transmits the collected information to the PDE 24, which carries out accurate position calculations using GPS satellite information previously collected by the PDE 24.

In a preferred embodiment, the PDE 24 further includes an antenna 32 for receiving a reference signal 34, and the wireless devices 14 are adapted to receive the reference signal 34 through the antennas 20. The reference signal 34 may include any signal that is available for reception by both the PDE 24 and at least one wireless device 14 that is within the coverage area of the wireless communications system 10. The reference signal 34 preferably originates from a radio frequency (RF) signal source that is not part of either the wireless communications system 10 or the satellite positioning system. For example, the signal 34 may be an FM radio broadcast signal, an AM radio broadcast signal, a television broadcast signal or another radio frequency signal. As will be described below, the reference signal 34 is used by both the wireless device 14 and the PDE 24 to provide the wireless device 14 with aiding information to assist with GPS signal acquisition.

Figure 2:
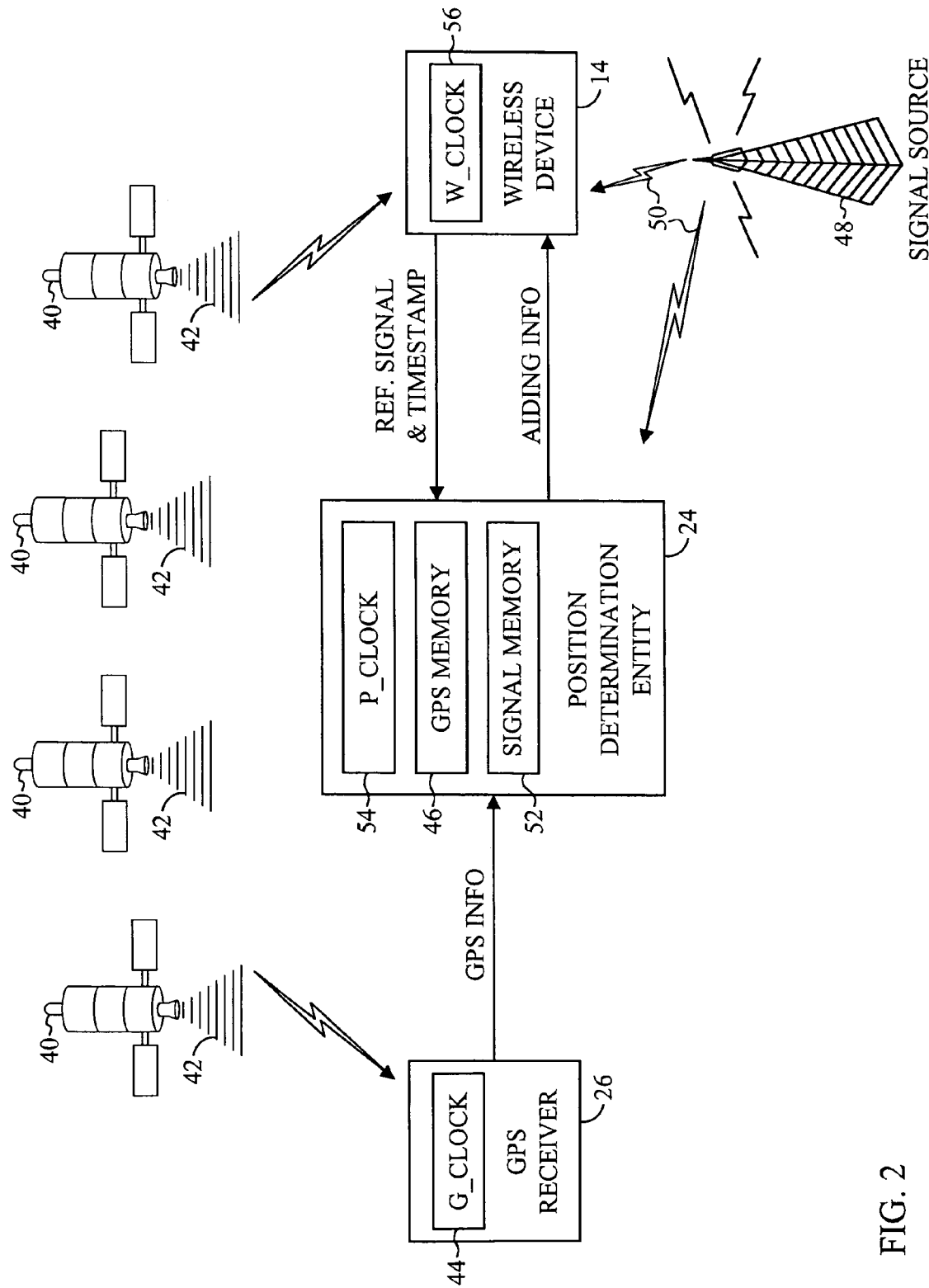
FIG. 2 illustrates a preferred method for providing timing information to a wireless device.

A preferred method for providing timing information to a wireless device will now be described with reference to the block diagram of FIG. 2. A plurality of GPS satellites 40 continually transmit GPS signals 42 for reception by GPS receivers on earth. Each GPS signal 42 includes a unique pseudorandom noise (PN) code that identifies the transmitting GPS satellite 40, the current position of the transmitting GPS satellite, and the GPS transmission time. The GPS receiver 26 continually receives the GPS signals 42 from the GPS satellites 40 that are in view of the GPS receiver 26. The GPS receiver 26 includes a timing source G_CLOCK 44, which is preferably synchronized with the GPS time. Through the received GPS signals 42, the GPS receiver 26 tracks the identities and positions of the GPS satellites 40 that are in view, derives current Doppler shift information for the GPS signals 42, and tracks the periodic time at which each PN frame is received at the GPS receiver 26. The GPS satellite information collected by the GPS receiver 26 is transmitted to the PDE 24 and stored in a GPS memory 46 for use by the PDE 24 in providing position determination assistance to the wireless device 14. It will be appreciated by those having ordinary skill in the art that one or all of the functions of the GPS receiver 26 may be implemented as part of the PDE 24.

The PDE 24 and the wireless device 14 are adapted to receive one or more reference signals 50 that are transmitted from one or more signal sources 48. In a preferred embodiment, the reference signals 50 are radio frequency (RF) signals. In most terrestrial regions, RF signals are ubiquitous and may include signals transmitted on the FM radio frequency band (i.e., 88 MHz to 108 MHz), the AM radio frequency band (i.e., 525 kHz to 1,700 kHz), the VHF television frequency bands (i.e., 54 MHz to 88 MHz, 174 MHz to 220 MHz) and other frequency bands. The PDE 24 and the wireless device 14 are preferably adapted to receive a subset of the available RF signals that provides substantially ubiquitous coverage throughout the wireless communications system 10 (e.g., the FM radio frequency band).

In operation, the PDE 24 continually receives a reference signal 50 and stores a sample of the received reference signal 50 in a signal memory 52 for later use in providing GPS assistance to the wireless device 14. In a preferred embodiment, the signal memory 52 is a buffer that maintains the most recent 2-3 seconds of the received reference signal 50. The PDE 24 also includes a timing source, P_CLOCK 54 that is preferably synchronized with the GPS time. The PDE 24 uses P_CLOCK 54 to track the time at which the contents of the signal memory 52 were received by the PDE 24.

A preferred process for determining the geographic position of the wireless device 14 is illustrated in the flow diagram of FIG. 3, and will be described below with reference to FIG. 2. The process is preferably initiated by the user of the wireless device 14. In alternate embodiments, the process may be initiated by the wireless device 14, the position determination entity 24, or another device or entity. In Step 60, the wireless device 14 receives the reference signal 50 and, in Step 62, samples a snippet of the reference signal 50. In a preferred embodiment, the snippet includes 2-3 milliseconds of the reference signal 50. In Step 64, the time at which the sampled reference signal 50 snippet was received at the wireless device 14 is determined using a local clock W_CLOCK 56. In a preferred embodiment, W_CLOCK 56 is not synchronized with the other clocks in the wireless communications system 10, such as G_CLOCK 44, P_CLOCK 54 or the GPS time. In Step 66, the wireless device 14 transmits the snippet and the timestamp across a wireless communications link to the PDE 24 as part of a request for GPS aiding information. In Step 68, the wireless device 14 receives the requested GPS aiding information and, in Step 70, the aiding information is used to assist the wireless device 14 in acquiring the GPS signals 42 from the GPS satellites 40 that are in view. In a preferred embodiment, the aiding information provides the wireless device 14 with the identities of the GPS satellites 40 that are in view, associated Doppler information and the time, as measured by W_CLOCK 56, at which the wireless device 14 is predicted to receive PN frame. After the GPS signals 42 are acquired, the position of the wireless device 14 is determined in Step 72 in accordance with methods known to those having ordinary skill in the art.

The information received in the acquired GPS signals may be used by the wireless device 14 to synchronize W_CLOCK 56 with GPS time. After W_CLOCK 56 is synchronized with GPS time, GPS aiding information may be provided to the wireless device 14 in a conventional manner, without using a reference signal. However, it is recognized that many wireless devices lack a precise timing source and will require recurrent synchronization of the local clock. In a preferred embodiment, the wireless device 14 maintains a variable identifying the amount of time that has passed since the last GPS time fix. After a predetermined amount of time has passed without a GPS time fix, the next request for aiding information will include a snippet of a reference signal and an associated timestamp as described above.

A preferred process for providing the aiding information to the wireless device 14 is illustrated in the flow diagram of FIG. 4, and will be described below with reference to FIG. 2. In Step 80, the PDE 24 receives a request for GPS assistance from the wireless device 14. The request includes a reference signal snippet and a timestamp. Next, in Step 82, the PDE 24 prepares GPS aiding information for the wireless device 14, from the GPS satellite information stored in the GPS memory 46. The GPS aiding information preferably includes the identities of the GPS satellites 40 in view of the GPS receiver 26, associated Doppler information for the GPS signals 42 received by the GPS receiver 26, and the time at which the beginning of each PN frame is received at the GPS receiver 26. Other GPS aiding information may also be included, such as the positions of the GPS satellites in view and differential correction data. The PDE. 24 preferably selects GPS satellite information associated with the GPS receiver 26 that is closest to the base station through which the wireless device 14 and the PDE 24 communicate. Because the wireless device 14 is proximate to the GPS receiver 26, it is expected that the same GPS satellites 40 will be in view to the wireless device 14 and that the GPS signals 42 received by the wireless device 14 will have a similar Doppler shift. In addition, it is expected that the wireless device 14 will receive the PN frames at approximately the same GPS times as the GPS receiver 26.

In a preferred embodiment, the PDE 24 converts the GPS timing data in the aiding information to the time domain used by the wireless device 14 and W_CLOCK 56. In Step 84, the PDE 24 searches the signal memory 52 for the reference signal snippet received from the wireless device 14. If a match is found in Step 86, the PDE 24 compares the received timestamp against the reception time of the stored signal, and computes a time offset □t between the two clocks, W_CLOCK 56 and P_CLOCK 54, in Step 88. In Step 90, the PDE 24 uses the time offset □t to convert the timing data in the aiding information from the time domain of the PDE 24 and P_CLOCK 54 to the time domain used by the wireless device 14 and W_CLOCK 56. The GPS aiding information is then transmitted to the wireless device 14 in Step 92. The wireless device 14 may use the received aiding information to assist the wireless device 14 in acquiring the GPS satellite signals 42 and calculating its geographic position. In an alternate embodiment, after the PDE 24 computes the time offset Lit, the unmodified GPS aiding information and the time offset □t are transmitted to the wireless device 14. The wireless device 14 may then use the time offset □t to synchronize W_CLOCK 56 with P_CLOCK 54 or perform its own adjustments to the GPS timing information. It is recognized that the accuracy of the synchronization, and consequently the length of time required to acquire the GPS signals, will depend in part on the distance between the wireless device and the reference signal receiver of the PDE 24. In a preferred embodiment, each stationary reference signal receiver is positioned within 300 km of at least one other stationary reference signal receiver.

Figure 5:
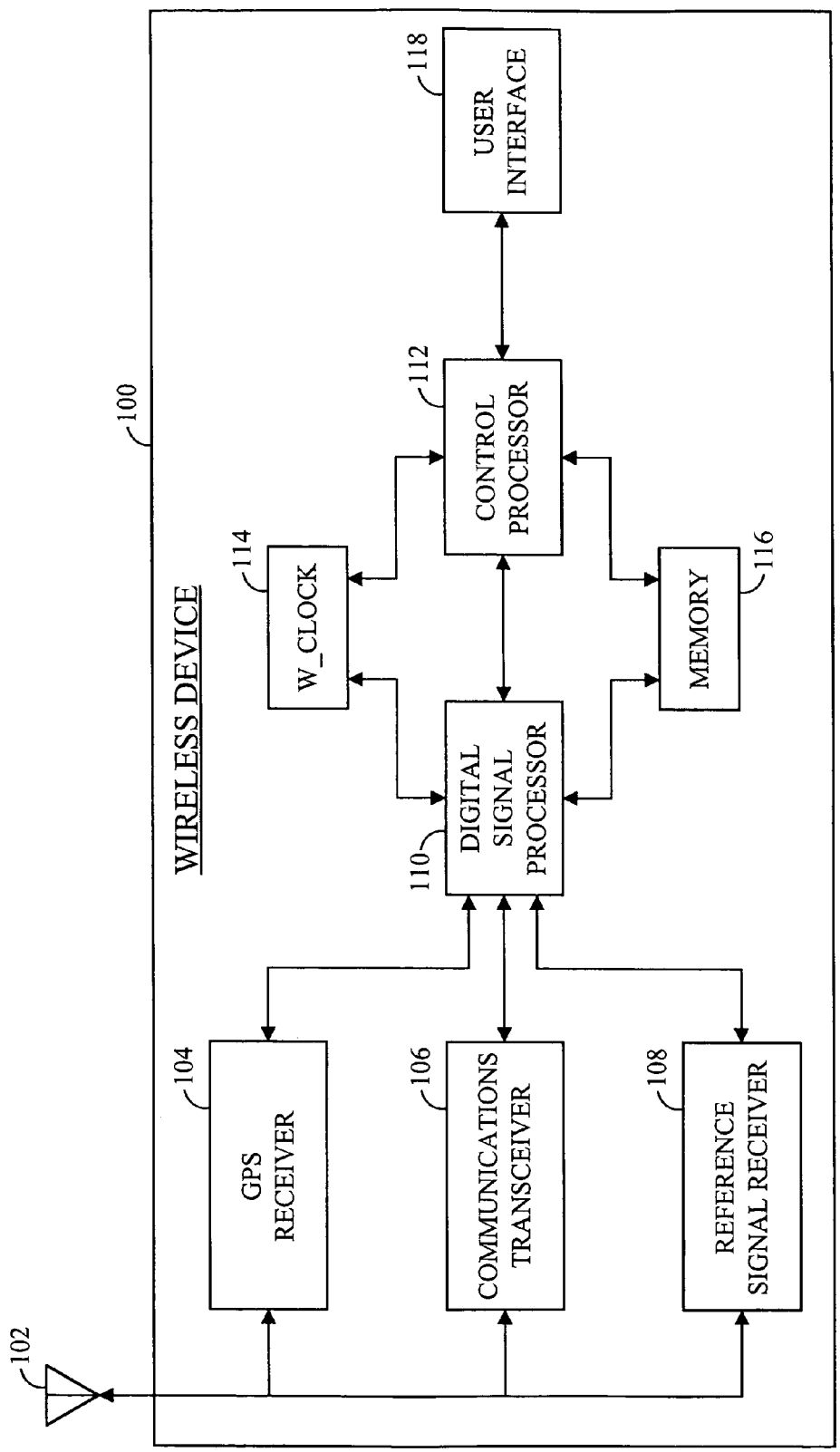
FIG. 5 is a block diagram illustrating a wireless device in accordance with a preferred embodiment of the present invention.

A preferred embodiment of a wireless device 100 will now be described with reference to the block diagram of FIG. 5. The wireless device 100 includes at least one antenna 102 adapted to transmit and receive radio frequency (RF) signals. RF signals received by the antenna 102 are selectively routed to a GPS receiver 104, a communications transceiver 106, and a reference signal receiver 108. The receivers 104, 106 and 108 are coupled to at least one digital signal processor 110, which controls the signal processing of the received GPS satellite signals, communications signals and reference signals, respectively. The digital signal processor 110 is coupled to a control processor 112, which controls the operation of the wireless device 100. The digital signal processor 110 and control processor 112 may be implemented as a single processor, a plurality of processors or a combination of processors and dedicated circuitry including application specific integrated circuits (ASICs). The control processor 112 is coupled to a timing source W_CLOCK 114, which maintains a local time for the wireless device 100, a memory 116 and a user interface 118. The memory 116 preferably includes random access memory and a program memory which stores execution instructions for controlling the digital signal processor 110 and control processor 112, and a random access memory (RAM). In a preferred embodiment the wireless device 100 is a mobile telephone, and the user interface 118 includes circuitry and components for providing a user of the wireless device 100 with a numeric keypad for user input of telephone numbers and other information, a visual display, a microphone and a speaker. In alternate embodiments, the wireless device 100 may be a PDA, a vehicle navigation system, a mobile personal computer, a pager or another wireless device.

The GPS receiver 104 includes circuitry for receiving GPS signals and converting the received GPS signals to digital. The digital signal processor 110 is preferably adapted to locate the PN codes in the GPS signals, extract satellite information from the GPS signals, calculate pseudoranges and determine the current geographic position of the wireless device 100. In an alternate embodiment, the digital signal processor 110 and control processor 112 are adapted to transmit received GPS information to the PDE using the communications transceiver 106 and antenna 102. The communications transceiver 106 includes circuitry for receiving communications signals and converting received communications signals to digital for processing by the digital signal processor 110. The communications transceiver 106 also includes circuitry for converting digital signals to analog and transmitting the analog signals across a wireless communications link through the antenna 102. In a preferred embodiment, the wireless device 100 is a mobile telephone and the digital signal processor 110 and control processor 112 are adapted to process, transmit and receive voice and data communications through the communications transceiver 106. The reference signal receiver 108 may be a conventional radio frequency (RF) receiver as known in the art, including circuitry for receiving a reference signal and converting the reference signal to digital for processing by the digital signal processor 110. The digital signal processor 110 is preferably adapted to sample and timestamp a portion of the received reference signal and feed the sample and timestamp to the communications transceiver 106 for transmission to the PDE through the antenna 102.

Figure 6:
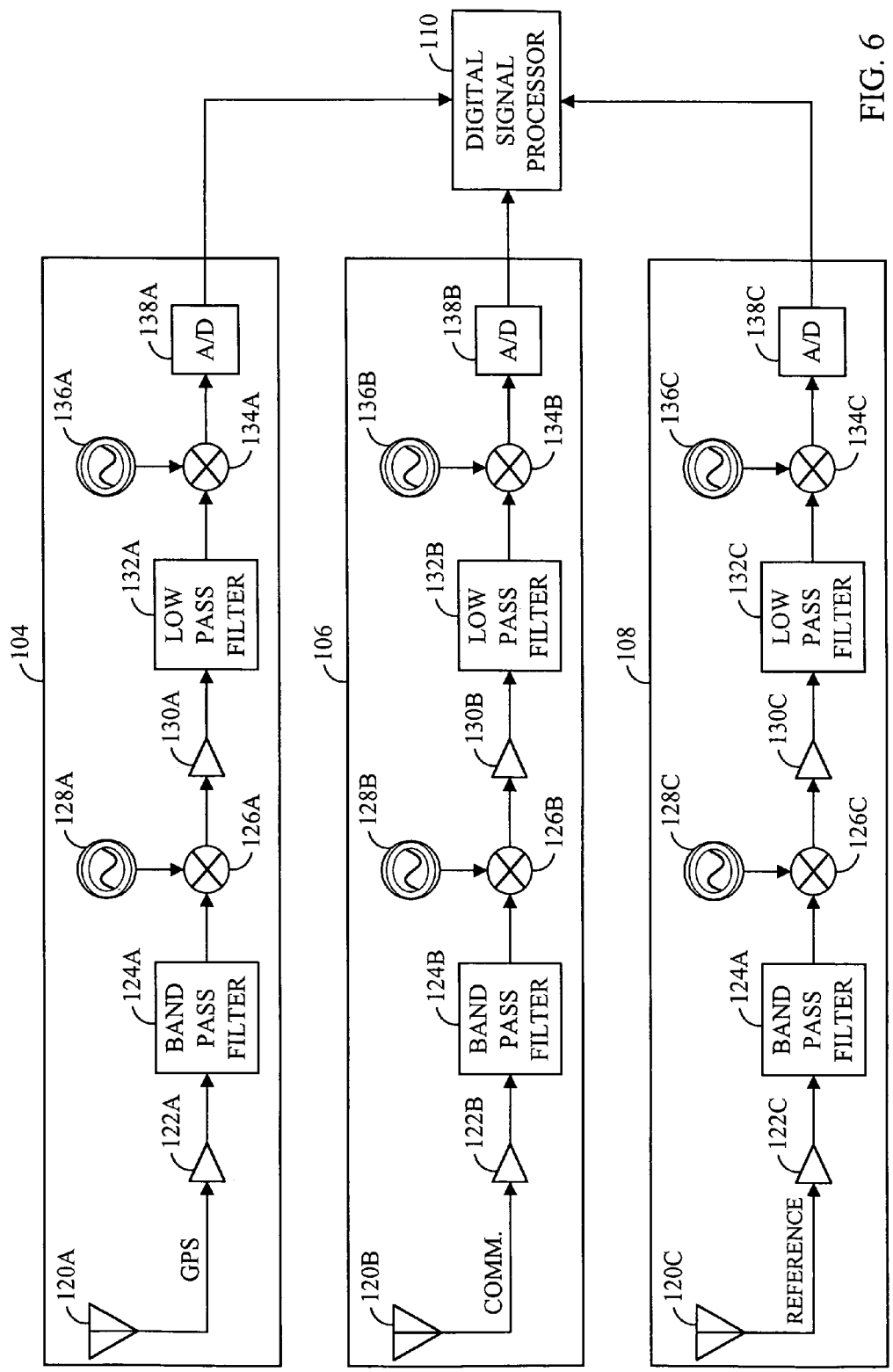
FIG. 6 is a block diagram illustrating a preferred circuitry for the receiving components of the wireless device.

FIG. 6 is a block diagram illustrating a preferred embodiment of the receiving components of the wireless device 100. Each of the receivers 104, 106 and 108 includes a double heterodyne receiver for receiving, downconverting and digitizing one of the GPS, communications and reference signals, respectively. The GPS receiver 104 includes an antenna 120*a* that is adapted to receive GPS signals. The antenna 120*a* is coupled to a first low noise amplifier 122*a*, the output of which is coupled to the input of a band pass filter 124*a*. The band pass filter 124*a* passes a GPS signal band having a center frequency of 1575.42 MHz and attenuates the communications signals, reference signals and other signals having frequencies outside the GPS signal band. The output of the band pass filter 124*a* is input to a first mixer 126*a*. A first oscillator 128*a* provides a second input to the first mixer 126*a* to downconvert the GPS signals to an intermediate frequency (IF) (e.g., 70 MHz), which is fed to the input of a second low noise amplifier 130*a*. The output of the second low noise amplifier 130*a* is coupled to a low pass filter 132*a*, which provides a first input to a second mixer 134*a*. A second oscillator 136*a* provides a second input to the second mixer 134*a* to downconvert the IF signal to a lower IF (e.g., 1 MHz). The output of the second mixer 134*a* is digitized by an analog to digital (A/D) converter 138*a* and provided as an input to the digital signal processor 110, which includes logic for processing the digitized GPS signals.

The receivers 106 and 108 include circuitry that is similar to the GPS receiver 104. The antenna 120*b* is adapted to receive communications signals and is coupled to the input of a first low noise amplifier 122*b*, the output of which is coupled to the input of a band pass filter 124*b*. The band pass filter 124*b* passes a communications signal band and attenuates the GPS signals, reference signals and other signals having frequencies outside the communications signal band. The output of the band pass filter 124*b* is input to a first mixer 126*b*. A first oscillator 128*b* provides a second input to the first mixer 126*b* to downconvert the communications signals, producing an IF signal that is fed to the input of a second low noise amplifier 130*b*. The output of the second low noise amplifier 130*b* is coupled to a low pass filter 132*b*, which provides a first input to a second mixer 134*b*. A second oscillator 136*b* provides a second input to the second mixer 134*b* to downconvert the IF signal to a lower IF. The output of the second mixer 134*b* is digitized by an A/D converter 138*b* and provided as an input to the digital signal processor 110, which includes logic for processing the digitized communications signals.

The antenna 120*c* is adapted to receive reference signals and is coupled to the input of a first low noise amplifier 122*c*, the output of which is coupled to the input of a band pass filter 124*c*. The band pass filter 124*c* passes a reference signal band and attenuates the GPS signals, communications signals and other signals having frequencies outside the reference signal band. For example, in a preferred embodiment, the reference signal receiver 108 is an FM receiver and the band pass filter 128*c* attenuates frequencies outside of the FM frequency band (i.e., 88 MHz to 107 MHz). The output of the band pass filter 124*c* is input to a first mixer 126*c*. A first oscillator 128*c* provides a second input to the first mixer 126*c* to downconvert the reference signals, producing an IF signal that is fed to the input of a second low noise amplifier 130*c*. The output of the second low noise amplifier 130*c* is coupled to a low pass filter 132*c*, which provides a first input to a second mixer 134*c*. A second oscillator 136*c* provides a second input to the second mixer 134*c* to downconvert the IF signal to a lower IF. The output of the second mixer 134*c* is digitized by an A/D converter 138*c* and provided as an input to the digital signal processor 110, which includes logic for processing reference signals.

Those skilled in the art will appreciate that other circuit implementations may be utilized to receive and process the GPS, communications and reference signals, including circuits that share components of the GPS, communications and reference signal receivers. An example of shared circuitry between GPS and communications receivers is illustrated in U.S. Pat. No. 6,111,540, entitled "COMBINED GPS POSITIONING SYSTEM AND COMMUNICATIONS SYSTEM UTILIZING SHARED CIRCUITRY," assigned to SnapTrack, Inc., and incorporated herein by reference.

Figure 7:
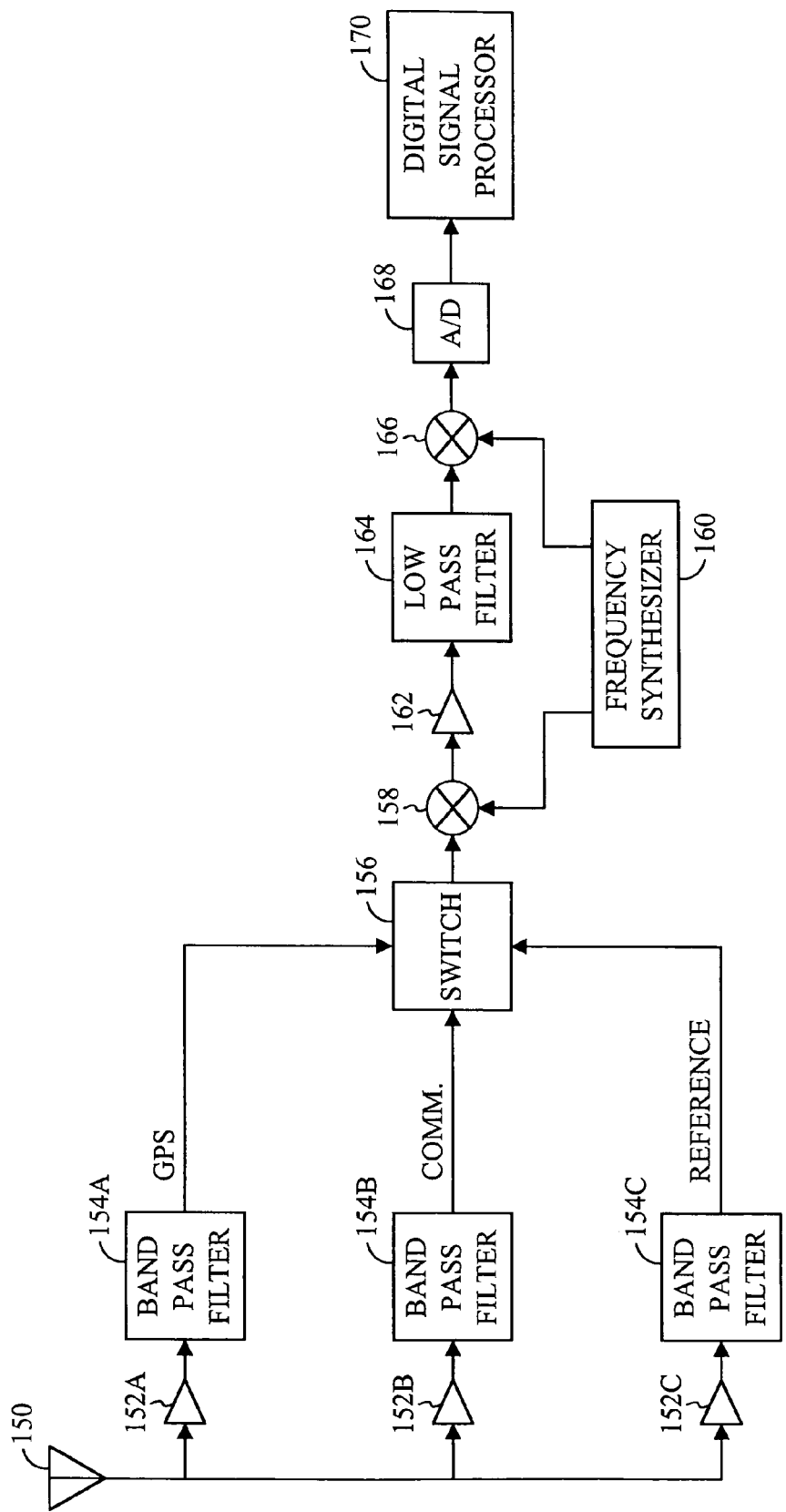
FIG. 7 is a block diagram illustrating a preferred shared circuitry for the receiving components of the wireless device in accordance with an alternative embodiment of the present invention.

An alternate embodiment utilizing shared circuitry is illustrated in the block diagram of FIG. 7. The receiving components include at least one antenna 150 which is coupled to three low noise amplifiers 152a, 152b and 152c, each of which is coupled to a band pass filter 154a, 154b and 154c, respectively. The band pass filter 154a passes GPS signals, the band pass filter 154b passes communications signals, and the band pass filter 154c passes reference signals, such as the FM radio band. The band pass filters 154a -c are selectively coupled to a first mixer 158 by a switch 156, which selects one of the signals for processing. A frequency synthesizer 160 outputs a reference frequency to the first mixer 158 to downconvert the selected RF signal type to an intermediate frequency (IF). The output of the first mixer 158 is coupled to a second low noise amplifier 162 which amplifies the signal for input to a low pass filter 164, which is coupled to a second mixer 166. The frequency synthesizer 160 outputs a reference frequency for the selected signal type to the second mixer 166 to convert the IF signal to a lower intermediate frequency. The second mixer 166 outputs a lower IF signal, which is digitized by an A/D converter 168 and fed into a digital signal processor 170. In a preferred embodiment, a processor controls the frequency synthesizer 160 to select the frequencies input to each of the mixers 158 and 166. It is contemplated that the reference frequency input to the first mixer 158 will vary depending on the signal type selected by the switch 156, while the same reference frequency may be input to the second mixer 166 for all three signal types.

In an alternative embodiment, the reference signal receiver further includes demodulation circuitry for recovering the information transmitted in the reference signal. The processor, or other components and circuitry of the wireless device, may also be adapted to present the recovered information through the user interface to the user of the wireless device. In one embodiment, the reference signal receiver is an FM radio receiver, and the demodulation circuitry is adapted to recover the audio information transmitted in the received FM broadcast signal. The recovered audio information is then played through a speaker of the wireless device.

Figure 8:
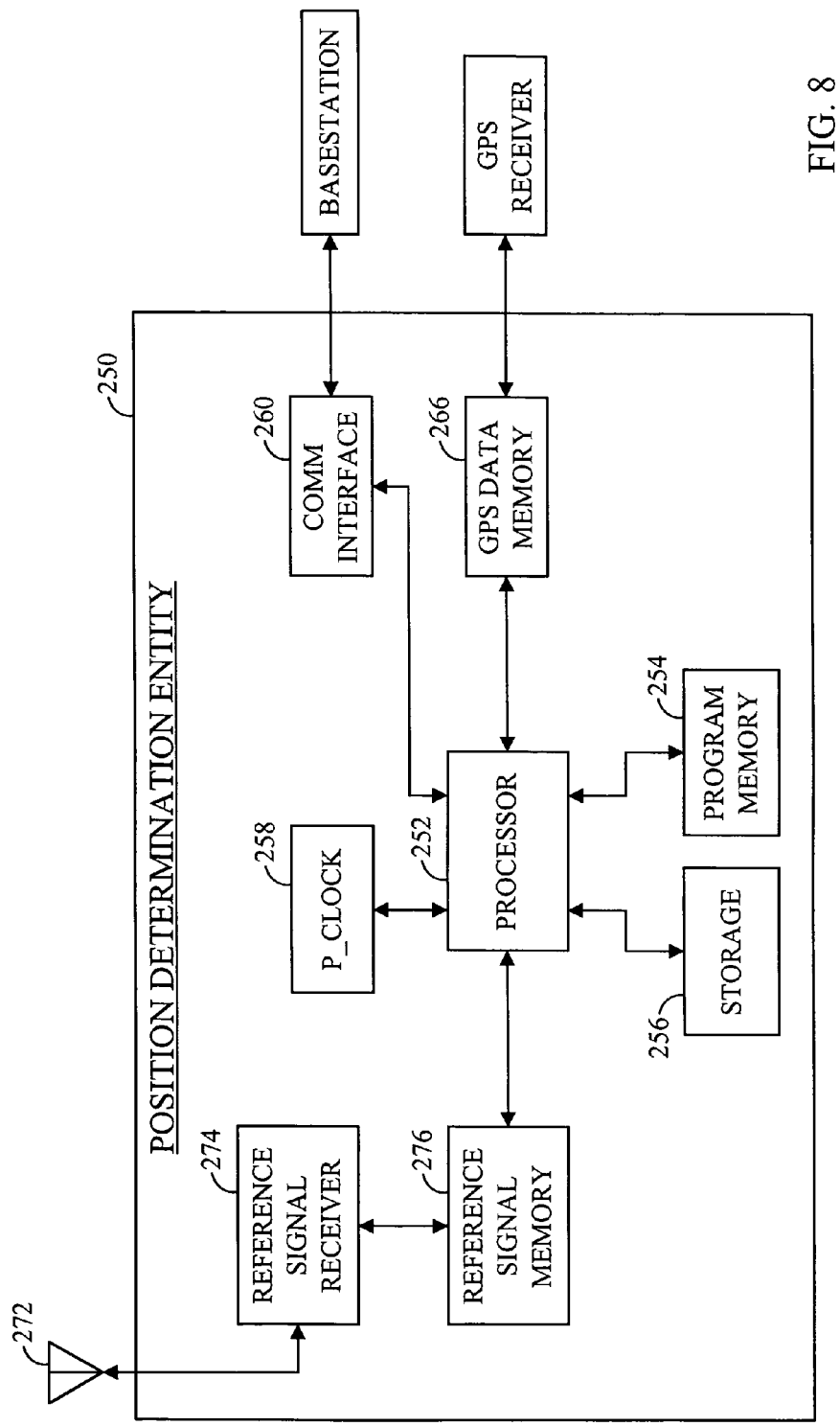
FIG. 8 is a block diagram illustrating a position determination entity in accordance with a preferred embodiment of the present invention.

A preferred embodiment of a PDE will now be described with reference to the block diagram of FIG. 8. A PDE 250 includes a processor 252, a program memory 254, a storage system 256, a local timing source P_CLOCK 258, and a communications interface 260. In a preferred embodiment, P_CLOCK 258 is synchronized with a central timing system, such as GPS time. The program memory 254 includes program logic for instructing the processor 252 to perform position determination and communications functions. The communications interface 260 is adapted to provide communications between the PDE 250 and wireless devices through a base station in a wireless communications network. The PDE 250 further includes a GPS data memory 266 for storing GPS satellite information received from at least one GPS receiver. The PDE 250 also includes at least one antenna 272 adapted to receive reference signals, such as FM signals. Reference signals received by the antenna 272 are fed to a reference signal receiver 274 which downconverts and digitizes the received reference signal. The digital signal is stored in a reference signal memory 276, which preferably stores the most recent 2-3 seconds of the received reference signal.

Multiple approaches are contemplated for coordinating the reference signals between the wireless device 100 and the PDE 250. In a preferred embodiment, the reference signal receiver 108 of the wireless device 100 and the reference signal receiver 274 of the position determination entity 250 are tuned to receive a predetermined reference frequency. In alternative embodiments, however, the receivers 108 and 274 are adapted to receive one or more RF frequency bands, which include a set of RF signals that provides substantially ubiquitous coverage of the wireless communications system.

In a first alternative embodiment, the reference signal frequency is selected by the wireless device 100. After the process for determining the geographic position of the wireless device 100 is initiated, the wireless device 100 scans the predetermined RF frequency bands for an RF signal. Preferably, the wireless device 100 steps through the available frequencies, measures the received signal strength at each step, and selects the frequency with the strongest received signal strength from which to sample a snippet. It will be appreciated, however, that any detected signal may be used as the reference signal. The wireless device 100 may then transmit the snippet and timestamp to the PDE 250, along with the carrier frequency of the selected reference signal. The PDE 250 may then search for the snippet in the reference signal memory on the received reference signal carrier frequency.

In a second alternative embodiment, the PDE 250 selects the reference signal frequency. The PDE 250 continually scans the RF frequency band for the strongest received signal strength, and stores the selected frequency in the reference signal memory. When the PDE 250 receives a request for aiding information, the PDE 250 transmits the selected carrier frequency to the wireless device 100. The wireless device 100 tunes to the selected carrier frequency and samples a snippet of the received signal. The wireless device 100 then transmits the snippet and a timestamp to the PDE 250.

Having thus described a preferred embodiment of Time Acquisition in an Wireless Position Determination System, it should be apparent to those skilled in the art that certain advantages of the within described system have been achieved. It should also be appreciated that various modifications, adaptations, and alternative embodiments thereof may be made within the scope and spirit of the present invention.

The scope of the present invention is defined by the following claims.

The invention claimed is:

1. In a wireless communications system including a position determination entity, a method for acquiring satellite positioning system signals comprising:

receiving a snippet of a reference signal, the snippet having a time of reception measured by a timing source, the reference signal being different than satellite positioning system signals that are to be used for determining position and the reference signal being different than signals from the wireless communications system;

transmitting a request for aiding information to the position determination entity, the request including the snippet and the time of reception;
receiving the requested aiding information; and
locating the satellite positioning system signals using the received aiding information;
wherein the aiding information is synchronized with the timing source.

2. The method of claim 1, wherein the timing source is not synchronized with the position determination entity.

3. The method of claim 1, wherein receiving a snippet comprises:
receiving a radio frequency (RE) signal; and
sampling a portion of the received radio frequency signal.

4. The method of claim 3, wherein the RF signal is an FM radio broadcast signal.

5. The method of claim 3, wherein the RF signal is ubiquitous throughout the wireless communications system.

6. The method of claim 1, wherein the aiding information includes timing information that identifies the time at which the wireless device is expected to receive the satellite signals.

7. In a satellite positioning system (SPS) including a position determination entity, a wireless device comprising:
a reference signal receiver adapted to receive an RF signal;
a signal processor coupled to the reference signal receiver, the signal processor adapted to extract a snippet of the RF signal and determine a time of reception at which the snippet of the RF signal was received by the reference signal receiver, the RF signal being different than SPS satellite signals that are to be used for determining position and the RF signal being different than any communications signals of the wireless device from a wireless communications network;
a wireless communications transceiver adapted to transmit the snippet and time of reception to a position determination entity, and receive SPS aiding information from the position determination entity;
a SPS receiver adapted to receive SPS satellite signals using the SPS aiding information;
a processor; and
a timing source;
wherein the time of reception of the snippet is determined using the timing source;
wherein the SPS aiding information includes a time offset, and
wherein the processor is adapted to synchronize the timing source with the position determination entity using the time offset.

8. The wireless device of claim 7, wherein the reference signal receiver is an FM radio receiver.

9. The wireless device of claim 7, wherein the reference signal receiver is an AM radio receiver.

10. The wireless device of claim 7, wherein the reference signal receiver is a television signal receiver.

11. In a wireless communications network including a wireless device having a first clock and a position determination entity having a second clock a method for providing global positioning system (GPS) timing information to the wireless device, the method comprising:
receiving a reference signal that is different than GPS satellite signals and is different than signals from the wireless communications network;
extracting a snippet of the received reference signal;
determining a time of reception for the snippet according to the first clock;
transmitting the snippet and the time of reception to the position determination entity; and
receiving aiding information from the position determination entity, the aiding information including timing information relating to the acquisition of a satellite positioning system signal to be used for determining position, the timing information being synchronized with the first clock.

12. The method of claim 11 wherein the step of extracting a snippet comprises the step of sampling a portion of the received reference signal.

13. The method of claim 12 wherein the reference signal is an FM radio broadcast signal.

14. The method of claim 13 wherein the FM radio broadcast signal is ubiquitous throughout the wireless communications network.

15. A method for acquiring satellite positioning system signals in a wireless communications system, comprising:
using a difference in respective times of receipt of a commonly received reference signal by a wireless communications device and a position determination entity to synchronize respective clocks thereof, the commonly received reference signal being different than signals from the wireless communications system;
receiving aiding information from the position determination entity by the wireless communications device; and
acquiring the satellite positioning system signals using the received aiding information, the satellite positioning system signals to be used in determining a position of the wireless communications device.

* * * * *